(12) United States Patent
Chen

(10) Patent No.: US 8,405,370 B2
(45) Date of Patent: Mar. 26, 2013

(54) POWER REGULATION FOR LARGE TRANSIENT LOADS

(75) Inventor: Wei Chen, Saratoga, CA (US)

(73) Assignees: Silergy Technology, Sunnyvale, CA (US); Silergy Semiconductor Technology (Hang Zhou) Ltd. (CN)

( * ) Notice: Subject to any disclaimer, the term of this patent is extended or adjusted under 35 U.S.C. 154(b) by 0 days.

(21) Appl. No.: 13/352,548

(22) Filed: Jan. 18, 2012

(65) Prior Publication Data

US 2012/0112716 A1 May 10, 2012

Related U.S. Application Data

(63) Continuation of application No. 12/383,501, filed on Mar. 25, 2009, now Pat. No. 8,138,731.

(51) Int. Cl.
*G05F 1/00* (2006.01)
(52) U.S. Cl. .................................. 323/272
(58) Field of Classification Search .......... 323/272; 307/44
See application file for complete search history.

(56) References Cited

U.S. PATENT DOCUMENTS

| | | | |
|---|---|---|---|
| 5,610,450 A * | 3/1997 | Saeki et al. | 307/46 |
| 7,709,976 B2 * | 5/2010 | Bazinet | 307/85 |
| 7,852,053 B2 * | 12/2010 | Martin et al. | 323/272 |
| 2005/0083715 A1 * | 4/2005 | Guillarme et al. | 363/65 |
| 2007/0279021 A1 * | 12/2007 | Yanagida et al. | 323/272 |
| 2008/0129266 A1 | 6/2008 | Endo et al. | |
| 2008/0152974 A1 | 6/2008 | Murabayashi | |

FOREIGN PATENT DOCUMENTS

CN 101317320 A 12/2008

* cited by examiner

*Primary Examiner* — Jue Zhang
(74) *Attorney, Agent, or Firm* — Michael C. Stephens, Jr.

(57) ABSTRACT

Methods and circuits for power supply arrangement and control are disclosed herein. In one embodiment, a power supply can include: (i) an input capacitor coupled to an input terminal that is coupled to a power source, where the power source provides power that is constrained by a predetermined limit; (ii) an output capacitor coupled to an output terminal that is coupled to a load, where the load has a first load condition or a second load condition; (iii) a first regulator to convert an input voltage at the input terminal to an output voltage at the output terminal to power the load; (iv) a second regulator coupled to the first regulator; and (v) an energy storage element coupled to the second regulator, where the second regulator delivers energy from the energy storage element to the first regulator to maintain regulation of an output voltage at the output terminal when in the second load condition.

21 Claims, 14 Drawing Sheets

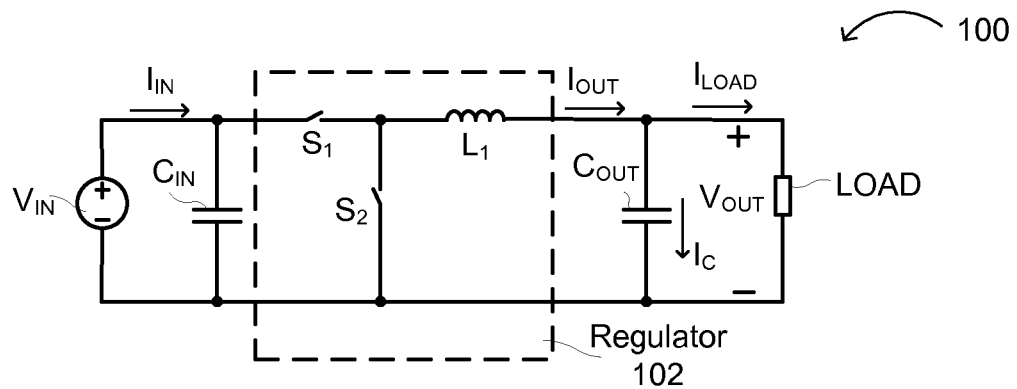
FIG. 1A (conventional)
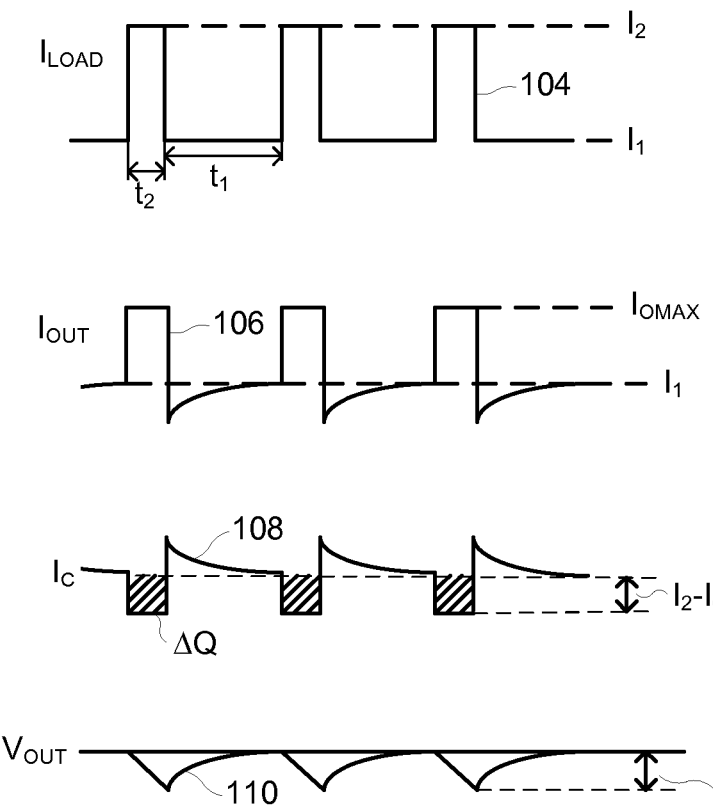
FIG. 1B (conventional)

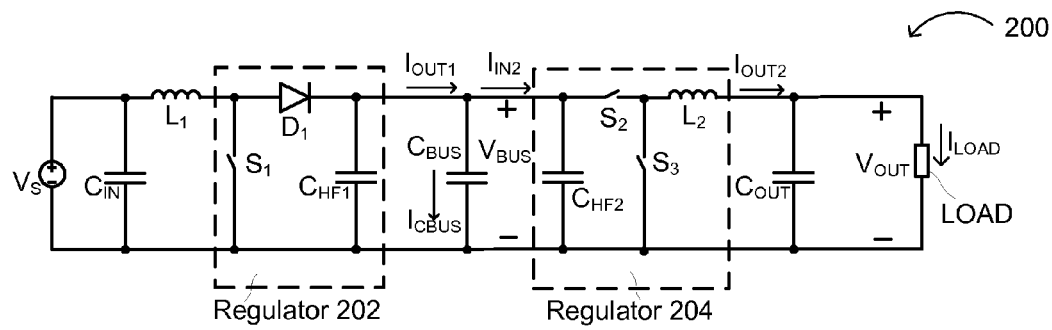
FIG. 2A (conventional)
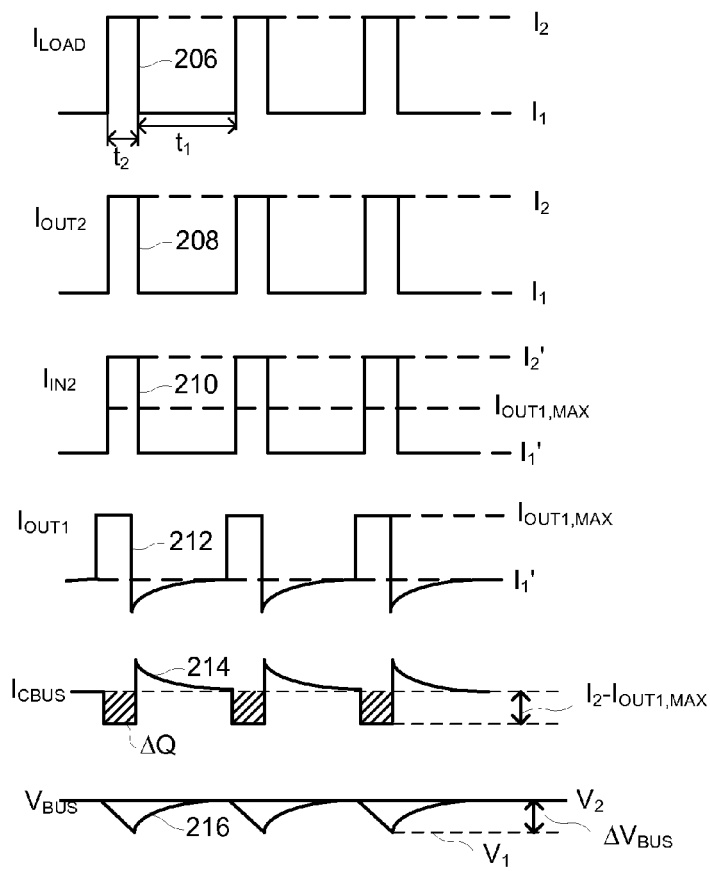
FIG. 2B (conventional)

US 8,405,370 B2

POWER REGULATION FOR LARGE TRANSIENT LOADS

CROSS REFERENCES TO RELATED APPLICATIONS

This application is a continuation of the following application, U.S. patent application Ser. No. 12/383,501, entitled "POWER REGULATION FOR LARGE TRANSIENT LOADS," filed on Mar. 25, 2009, and which is hereby incorporated by reference as if it is set forth in full in this specification.

FIELD OF THE INVENTION

The present invention generally relates to the field of semiconductor devices. More specifically, embodiments of the present invention pertain to power regulation.

BACKGROUND

Voltage regulators, such as DC-to-DC voltage converters, are used to provide stable voltage sources for various electronic systems. Efficient DC-to-DC converters are particularly needed for battery management in low power devices (e.g., laptop notebooks, cellular phones, etc.). A switching voltage regulator generates an output voltage by converting an input DC voltage into a high frequency voltage, and then filtering the high frequency input voltage to generate the output DC voltage. Specifically, the switching regulator includes a switch for alternately coupling and decoupling an input DC voltage source (e.g., a battery) to a load (e.g., an integrated circuit (IC)). An output filter, typically including an inductor and a capacitor, may be coupled between the input voltage source and the load to filter the output of the switch, and thus provide the output DC voltage. A controller (e.g., a pulse width modulator (PWM)), a pulse frequency modulator, etc.) can control the switch to maintain a substantially constant output DC voltage.

In certain applications (e.g., radio frequency (RF) transmission, portable computing applications, etc.) instant power drawn by the RF or digital chips can be so large that the input source for the voltage regulator may not be able to provide support. Consequently, voltage regulator output voltage may sag, and associated performance of the RF or digital chips may suffer, possibly degrading typical system operation.

SUMMARY

Embodiments of the present invention relate to high density power regulators and/or supplies with minimum capacitor size, and suitable for large transient applications.

In one embodiment, a power supply can include: (i) an input capacitor coupled to an input terminal that is coupled to a power source, where the power source provides power that is constrained by a predetermined limit; (ii) an output capacitor coupled to an output terminal that is coupled to a load, where the load has a first load condition or a second load condition; (iii) a first regulator to convert an input voltage at the input terminal to an output voltage at the output terminal to power the load; (iv) a second regulator coupled to the first regulator; and (v) an energy storage element coupled to the second regulator, where the second regulator delivers energy from the energy storage element to the first regulator to maintain regulation of an output voltage at the output terminal when in the second load condition.

In another embodiment, a method of converting a power source at an input terminal into a regulated output level at a load coupled to an output terminal, can include: (i) regulating a voltage of the load directly from the power source using a first regulator; (ii) determining whether the load is in a first load condition or a second load condition; (iii) charging energy to an energy storage element during the first load condition; and (iv) discharging energy from the energy storage element when in the second load condition for maintaining the regulated output level at the load, and for maintaining input current or power below the predetermined limit.

Embodiments of the present invention can advantageously provide for high density power regulators and/or supplies. Further, embodiments of the present invention can be suitable for power supplies supporting large transient applications, with minimum capacitor sizes therein. These and other advantages of the present invention will become readily apparent from the detailed description of preferred embodiments below.

BRIEF DESCRIPTION OF THE DRAWINGS

FIG. 1A is a schematic diagram of an example voltage regulator for powering a load with large transient steps.

FIG. 1B is a waveform diagram showing example operation of the regulator shown in FIG. 1A.

FIG. 2A is a schematic diagram of an example two-stage power regulator for powering a load with large transient steps.

FIG. 2B is a waveform diagram showing example operation of the regulator shown in FIG. 2A.

DETAILED DESCRIPTION

Figure 3A:
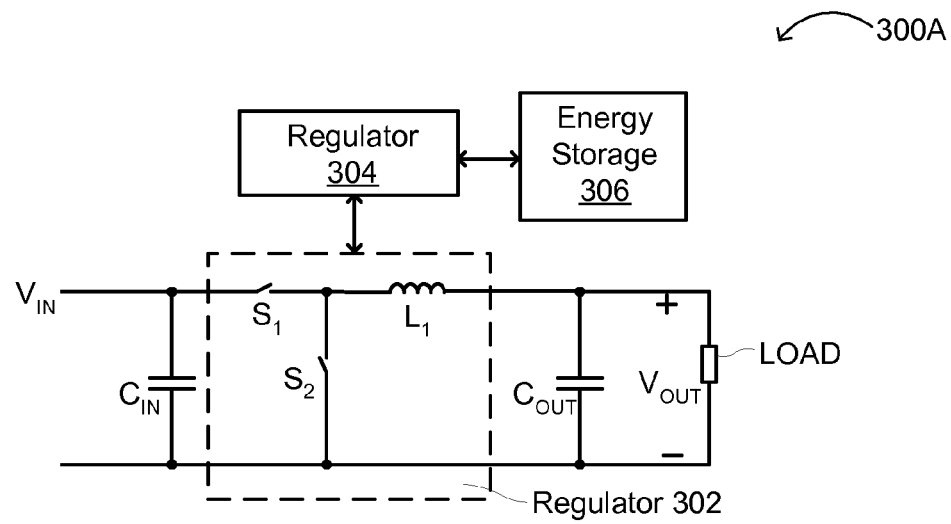
FIG. 3A is a block schematic diagram of a first example power regulator in accordance with embodiments of the present invention.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide for high density power regulators and/or supplies. Further, embodiments of the present invention are suitable for power supplies supporting large transient applications, with minimum capacitor sizes therein. The invention, in its various aspects, will be explained in greater detail below with regard to exemplary embodiments.

Particular embodiments can include a relatively small and high efficiency power regulator circuit and method suitable to meet relatively large transients. Further, particular embodiments can be used to minimize an overall size and cost of a power converter, supply, and/or regulator, as well as an associated capacitor. In one embodiment, a small parallel power regulator stage can be added onto a voltage regulator to charge energy in an energy storage element when the output load is relatively light. This additional regulator stage can also be used to discharge energy from the energy storage element when the output load is relatively heavy, in order to supply extra energy to make up a difference between the output power and available input power.

In one approach, relatively large capacitors may be added at output and/or input terminals of a voltage regulator. When a large transient at the output load occurs, extra energy to supply load components (e.g., digital, RF chips, etc.) may be provided by the extra capacitors placed at the input and/or output terminals of the voltage regulator. However, such extra capacitors increase overall regulator cost. In addition, relatively large capacitor sizes may not be suitable in many modern applications with space constraints (e.g., wireless cards, cell phones, portable electronics, etc.).

Referring now to FIG. 1A, shown is a schematic diagram 100 of an example voltage regulator for powering a load with large transient steps. FIG. 1B shows associated waveforms for example operation of the circuit of FIG. 1A. For example, large transient steps can occur in many applications, such as universal serial bus (USB) ports including notebook 3G (third generation) wireless cards (e.g., about 2-3 A of current during transmission), and WiMAX (Worldwide Interoperability for Microwave Access) having transients of from about 0.5 A to about 2 A. In FIG. 1A, regulator 102 includes switches $S_1$ and $S_2$ for controlling current for inductor $L_1$.

In operation during time internal $t_1$, the load (e.g., an RF amplifier) draws a low current level of $I_1$, and during time internal $t_2$ (e.g., when the RF amplifier is transmitting a signal), the load draws a high current level, $I_2$ (see, e.g., waveform 104). However, maximum output current $I_{OMAX}$ from regulator 102 may be limited by an amount of available power from input source $V_{IN}$ (see, e.g., waveform 106). Output capacitor $C_{OUT}$ may then support a difference between $I_2$ and $I_{OMAX}$ during time internal $t_2$ (see, e.g., waveform 108). In order to keep an output variation, $\Delta V_{OUT}$, relatively small (see, e.g., waveform 110), a relatively large output capacitor $C_{OUT}$ can be utilized. This extra capacitor for supporting a relatively large load step can be determined as shown below in Equation 1.

$$C_{OUT} = \frac{(I_2 - I_{o,max})t_2}{\Delta V_{OUT}} \quad (1)$$

In Equation 1, $I_{OMAX}$ represents a maximum output current allowed by an input power limit at the output voltage, $V_{OUT}$. As can be seen, the longer the duration $t_2$, the higher the amplitude $I_2$, and the larger the output capacitor $C_{OUT}$.

Another approach uses two series power stages, where the first power regulator stage steps up the input voltage to a higher bus voltage, and then the second power stage steps down the bus voltage to produce an output voltage for supplying the load (e.g., digital and RF chips). Referring now to FIG. 2A, shown is a schematic diagram 200 of an example two-stage power regulator for powering a load with large transient steps. FIG. 2B shows associated waveforms for example operation of the circuit of FIG. 2A.

In operation, input voltage $V_S$ may be stepped up to bus voltage $V_{BUS}$ across capacitor $C_{BUS}$ by the first (e.g., DC/DC) regulator 202 (see, e.g., $I_{OUT1}$ waveform 212 and $I_{IN2}$ waveform 210). Then, the second (e.g., DC/DC) regulator 204 steps down $V_{BUS}$ into $V_{OUT}$ across output capacitor $C_{OUT}$ to power the output load (see, e.g., $I_{OUT2}$ waveform 208 and $I_{LOAD}$ waveform 206). The output voltage of second regulator 204 can be relatively tight in variation, while allowing the voltage ($V_{BUS}$) on bus cap $C_{BUS}$ to fluctuate more substantially (see, e.g., $V_{BUS}$ waveform 216 and $I_{CBUS}$ waveform 214).

A minimum bus voltage for such configuration is $V_{IN}$, and a maximum bus voltage can determine a bus capacitor size, as shown below in Equation 2.

$$C_{BUS} \approx \frac{2(I_2 - I_{o,max})V_{OUT}t_2}{V_{BUS,MAX}^2 - V_{IN}^2} \quad (2)$$

By comparing Equation 2 against Equation 1, we can derive a ratio of $C_{BUS}$ to $C_{OUT}$ as shown below in Equation 3.

$$\frac{C_{BUS}}{C_{OUT}} \approx \frac{2 \cdot \left(\frac{\Delta V_{OUT}}{V_{OUT}}\right) V_{OUT}^2}{V_{BUS,MAX}^2 - V_{IN}^2} \quad (3)$$

In one example for a wireless transmitter load, the input voltage $V_{IN}$=5V, output voltage $V_{OUT}$=3.3V, the output regulation accuracy for load transients is 2%, and $V_{BUS,MAX}$=6V. From Equation 3, the size of $C_{OUT}$ is estimated to be about 25 times that of $C_{BUS}$ if the same load transient requirement is met. Thus, the total capacitor size reduction by using 2-stage power conversion is significant.

However, while this 2-stage approach reduces a total capacitor size of $C_{BUS}$ and $C_{OUT}$ in the system, drawbacks include a decrease in efficiency due to the product of the efficiencies of each regulator stage, as well as an increase in size and cost of the semiconductor switches and magnetic components. This increased cost and size may be significant because both power stages process the full output power.

Exemplary Power Supply Structures

In one example, a power supply includes: (i) an input capacitor coupled to an input terminal that is coupled to a power source, where the power source provides power that is constrained by a predetermined limit; (ii) an output capacitor coupled to an output terminal that is coupled to a load, where the load has a first load condition or a second load condition; (iii) a first regulator to convert an input voltage at the input terminal to an output voltage at the output terminal to power the load; (iv) a second regulator coupled to the first regulator; and (v) an energy storage element coupled to the second regulator, where the second regulator delivers energy from the energy storage element to the first regulator to maintain regulation of an output voltage at the output terminal when in the second load condition.

Referring now to FIG. 3A, shown is a block schematic diagram 300A of a first example power regulator in accordance with embodiments of the present invention. In this example, a main power flow includes regulator 302, and a parallel regulator path includes regulator 304. Energy storage element 306 can essentially be in parallel with regulator 302. Further, energy storage element 306 can be a capacitor, a battery, or any other suitable energy storage element. In operation, regulator 304 can discharge energy stored in energy storage element 306 when the output power drawn by the load exceeds an available input power from source $V_{IN}$. Regulator 304 can be bidirectional in nature, but configured to supply transient power to the load. Because of this targeted application of regulator 304, this approach is more efficient and smaller than conventional approaches.

Figure 3B:
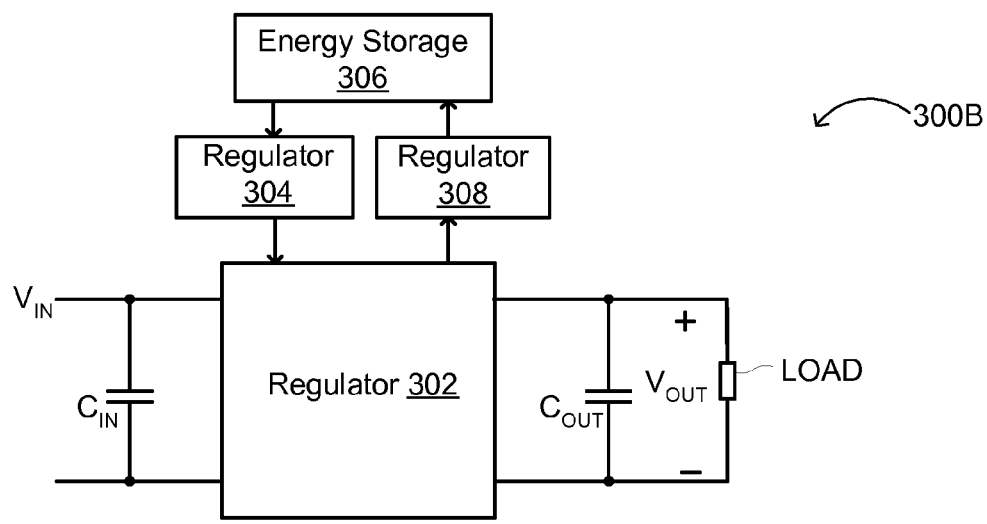
FIG. 3B is a block schematic diagram of a second example power regulator in accordance with embodiments of the present invention.

Referring now to FIG. 3B, shown is a block schematic diagram 300B of a second example power regulator in accordance with embodiments of the present invention. Regulator 308 can be added to provide a path from regulator 302 to storage 306, while regulator 304 can be configured to provide charge from energy storage element 306 to regulator 302. In this fashion, regulator 308 may be used to assist in the charging of energy storage element 306 during light load conditions (e.g., time duration $t_1$, as shown in FIGS. 1B and 2B). Further, regulator 304 can be used to discharge energy stored from energy storage element 306 during high transient load conditions (e.g., time duration $t_2$, as shown in FIGS. 1B and 2B).

As shown in various examples herein, regulator 304 uses an inductor-based switching regulator topology. However, any suitable type of regulation (e.g., linear regulators, transformer-based switching regulators, charge pump regulator circuit topologies, etc.) can be used for regulator 304, or other regulators, in certain embodiments. In addition, synchronous rectifiers are shown in examples herein in order to obtain high efficiency, but other types of rectifiers can also be used in particular embodiments. Further, switching regulators with only one switch and one rectifier may also be used for regulator 304 when regulator 308 is configured for charging energy storage element 306.

Figure 4A:
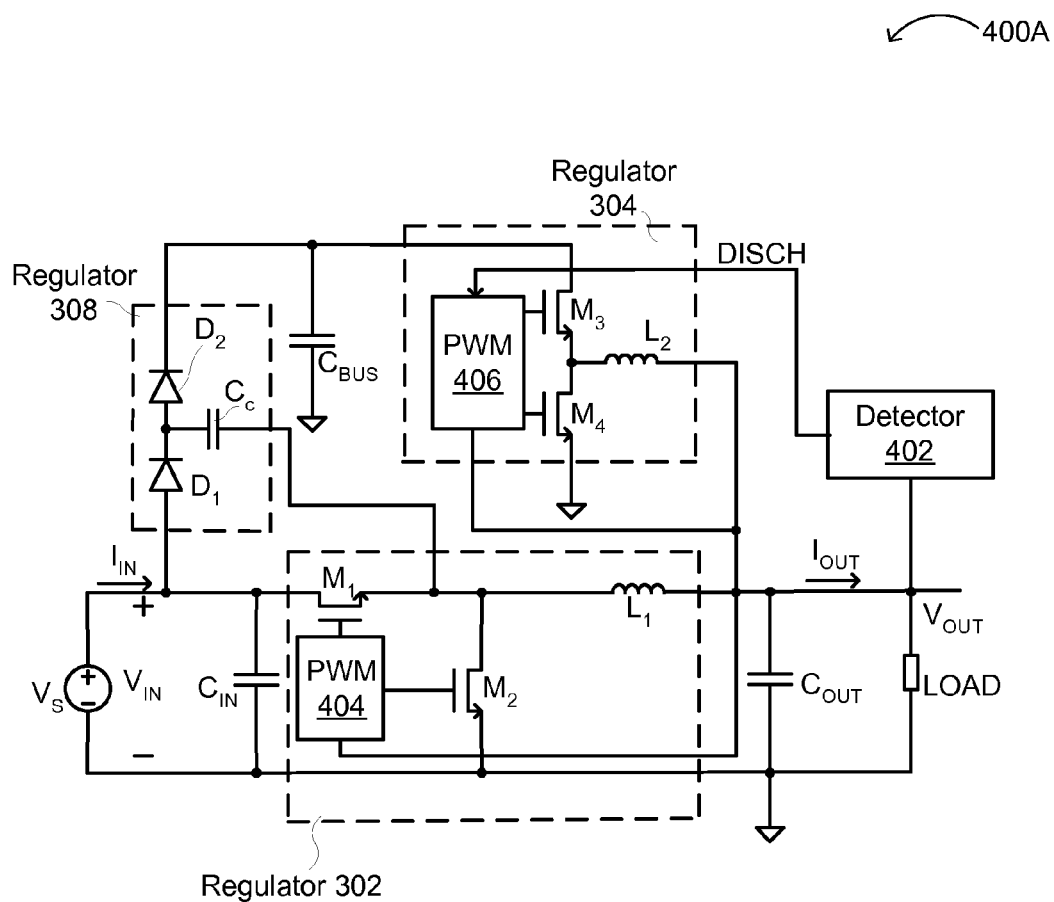
FIG. 4A is a schematic diagram of an example power regulator circuit with three regulator portions in accordance with embodiments of the present invention.

Referring now to FIG. 4A, shown is a schematic diagram 400A of an example power regulator circuit in accordance with embodiments of the present invention. Regulator 302 can provide output voltage $V_{OUT}$ from input voltage $V_{IN}$ using pulse width modulation (PWM) 404 control. When the load current steps to a high level (e.g., as determined by detector 402), regulator 304 may be allowed to discharge energy stored in an energy storage element (e.g., $C_{BUS}$) to the output directly. In this example circuit, regulator 308 can be implemented as a charge pump circuit with diodes $D_1$ and $D_2$, and capacitor $C_C$, and may be used to charge up $C_{BUS}$ using a switching waveform (e.g., from a node connecting switches $M_1$ and $M_2$, as well as inductor $L_1$) within regulator 302.

Detector 402 can be used for determining when the output voltage drops by a predetermined amount (e.g., by about 2%). Such a drop in the output voltage may indicate that regulator 302 cannot sufficiently support the output load. In response to this detected condition, regulator 304 can be turned on to discharge from $C_{BUS}$ directly onto the output node. Further, while two diodes and one capacitor are included in this particular "voltage-doubler" charge pump example for regulator 308, any suitable number of such diodes, capacitors, and charge pump stages can be included in particular embodiments.

Figure 4B:
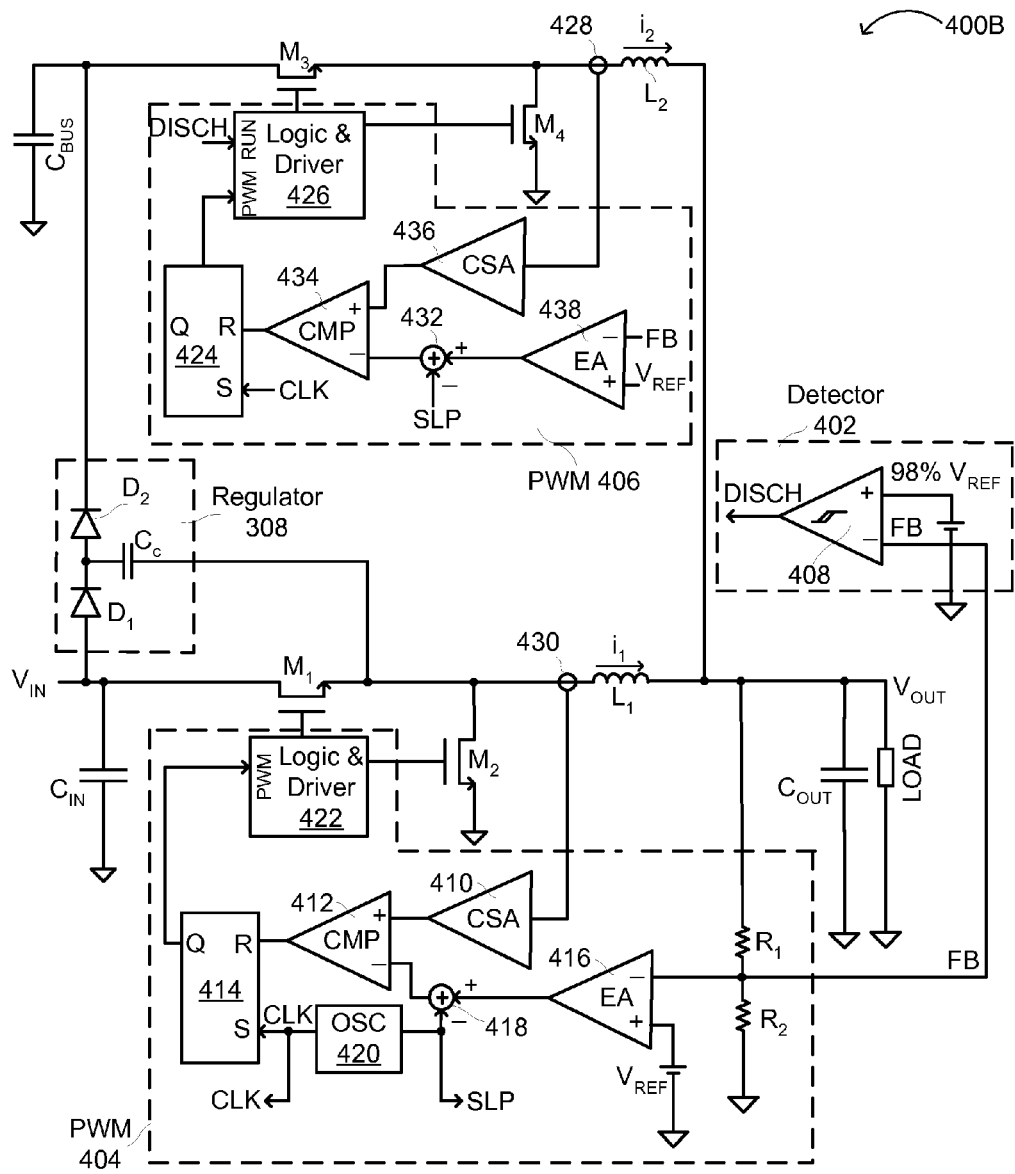
FIG. 4B is a schematic diagram of an example power regulator circuit with pulse width modulation (PWM) control in accordance with embodiments of the present invention.

Referring now to FIG. 4B, shown is a schematic diagram 400B of an example power regulator circuit in accordance with embodiments of the present invention. For example, both PWM 404 and PWM 406 loops may be fixed-frequency peak current mode type controls. In operation of PWM 404, a clock (CLK) from oscillator 420 may be used to turn on the top switch (e.g., transistor $M_1$) via R-S flip-flop 414 and logic/driver circuit 422, thus starting a switching cycle. The output voltage can be sensed (e.g., via resister divider network $R_1$ and $R_2$) and compared against a given reference (e.g., $V_{REF}$) to generate an error signal via error amplifier (EA) 416. This error signal from EA 416 may be subtracted at 418 by a slope compensation signal (SLP), which can be a "sawtooth" signal generated from oscillator 420, to generate a control signal input to comparator (CMP) 412. This control signal can then be compared with sensed inductor current (e.g., via current detector 430 and current sensing amplifier (CSA) 410). If the peak inductor current exceeds the sensed inductor current, the top switch $M_1$ may be turned off, and the rectifier or synchronous switch $M_2$ can conduct the current, lasting until the next clock arrives.

Detector 402 can sense the output voltage to initiate a discharge operation in the regulator formed by switches $M_3$ and $M_4$, with control PWM 406. If $V_{OUT}$ drops below, e.g., about 98% of a regulation point, the discharge command signal (DISCH) can go high. The DISCH signal can go low when $V_{OUT}$ recovers to an appropriate regulation level. The regulator formed by switches $M_3$ and $M_4$, with control PWM 406, only operates when DISCH is high. The driver and logic block 426 inside PWM 406 can receive control signals PWM control and RUN. When RUN is low, both $M_3$ and $M_4$ may be turned off. When RUN is high, PWM control may be allowed to control on/off of transistors $M_3$ and $M_4$, where a high PWM control signal turns on $M_3$ and turns off $M_4$, while a low PWM control signal turns off $M_3$.

PWM 406 also may utilize a current mode control and fixed frequency architecture, where received a feedback voltage (FB) can be compared to reference $V_{REF}$ via error amplifier (EA) 438. Slope compensation (SLP) sawtooth signal can be used at summation circuit 432 for the peak current mode to maintain stability, and then may generate a control signal for comparison at comparator (CMP) 434 with the current sense information (e.g., via current detector 428 and CSA 436 for sensing $i_2$). Thus, current through inductor $L_2$ may be sensed, and CLK may turn on top switch $M_3$, and turn off switch $M_4$ via R-S flip-flop and logic and driver control 426, until the next clock cycle.

Figure 5A:
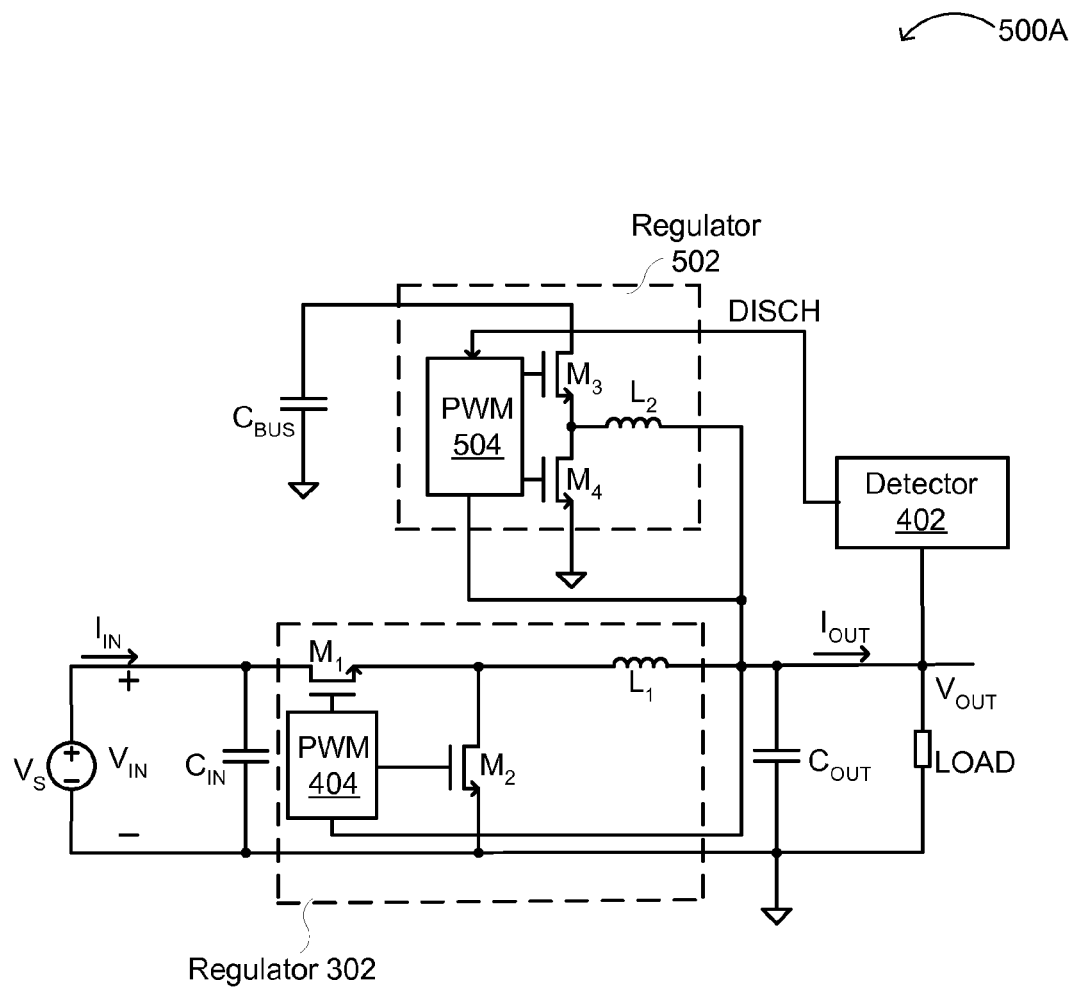
FIG. 5A is a schematic diagram of an example power regulator circuit with two regulator portions in accordance with embodiments of the present invention.

Referring now to FIG. 5A, shown is a schematic diagram 500A of an example power regulator circuit in accordance with embodiments of the present invention. This particular example may not include a charge pump circuit to charge up energy at $C_{BUS}$. Instead, this example includes regulator 502, and can utilize logic within PWM 504 to charge up the $C_{BUS}$ when the load current is light. Further, and also using PWM 504 control, $C_{BUS}$ may be discharged to the output when regulator 302 may not be able to supply a heavy load demand from available power at the input. Accordingly, this particular example circuit may provide flexibility in regulating the $C_{BUS}$ voltage to achieve a minimum capacitor size for $C_{BUS}$ by utilizing bi-directional control for PWM 504.

For example, if the input voltage $V_S$ is about 5V, by using the charge pump doubler circuit shown in FIG. 4B, the $V_{BUS}$ may be charged up to only slightly less than about 10V for a 16V-rated capacitor $C_{BUS}$. Even a voltage tripler charge pump may be used, with the $V_{BUS}$ being closer to about 15V, thus leaving little or no safety margin (e.g., about 25% derating) for the 16V cap. Thus, a practical $C_{BUS}$ voltage may only be 10V. If the exemplary scheme in FIG. 5A is used, the $C_{BUS}$ voltage can be increased to about 12V by satisfying the safety margin requirement: 16*0.75=12V. By applying Equation 2 shown above, one can calculate that the particular example shown in FIG. 5A can reduce a $C_{BUS}$ capacitor size by about 37%, as compared to the particular example shown in FIG. 4B. In addition, no charge pump diodes or capacitors are used in the example of FIG. 5A, thus further reducing cost and size.

Figure 5B:
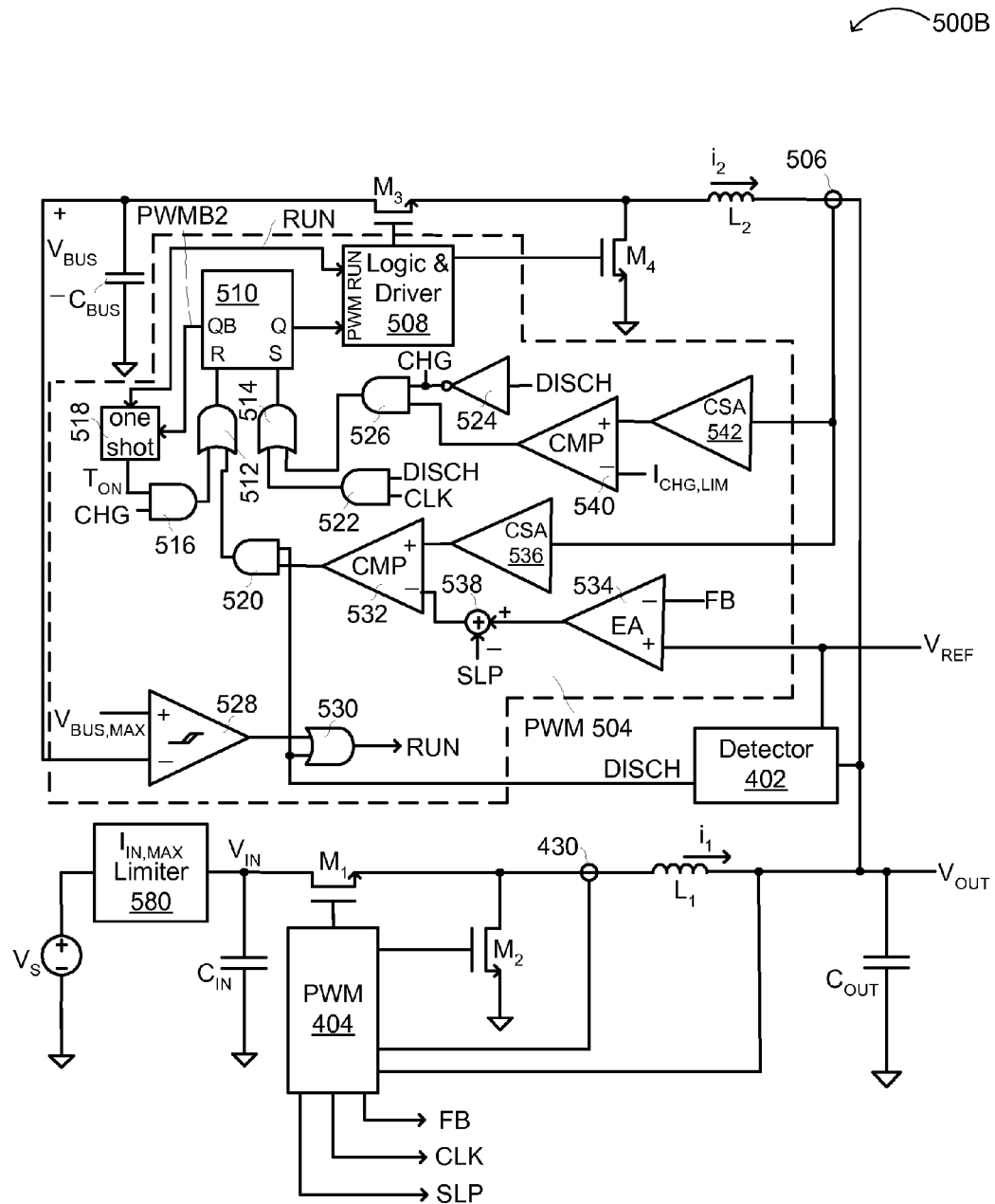
FIG. 5B is a schematic diagram of an example power regulator circuit with PWM control in accordance with embodiments of the present invention.

Referring now to FIG. 5B, shown is a schematic diagram 500B of an example power regulator circuit in accordance with embodiments of the present invention. In this example, PWM 504 is used in a bi-directional regulator that can discharge energy stored in $C_{BUS}$ under heavy load conditions, and charge $C_{BUS}$ when there is spare input power from the source $V_{IN}$. The output voltage $V_{OUT}$ can be sensed directly via detector 402 to detect such heavy load conditions. When $V_{OUT}$ is, e.g., about 2% below its regulation point, the DISCH control signal can go high, indicating discharging mode for the regulator controlled by PWM 504. In this fashion, PWM 504 may operate in a constant frequency peak current mode control. The discharging can stop when $V_{OUT}$ returns to a suitable regulation point. The charging can follow via control signal RUN when the input current is below a predetermined limit ($I_{IN,MAX}$), as shown with $I_{IN,MAX}$ limiter 580, and the $C_{BUS}$ voltage ($V_{BUS}$) is below threshold $V_{BUS,MAX}$, via comparator 528 and OR-gate 530.

In charging mode, $M_4$ may be turned on until the charging current reaches the current limit, $I_{CHG,LIM}$. $M_3$ may then be turned on for a preprogrammed time, $T_{ON}$, which is generated via one-shot circuit 518 after the rising edge of PWMB2 is detected. $T_{ON}$ can be designed to be proportional to $V_{BUS}$ for maintenance of a roughly constant frequency operation. A next charging cycle can repeat as soon as the $T_{ON}$ timer expires. The charging operation can stop when $V_{BUS}$ reaches a preset maximum level. Note that the current $i_2$ may have different polarities during the charging and discharging modes, where the gain in current sense amplifier 536 is positive and the gain in 542 is negative. Further, the charging current limit, $I_{CHG,LIM}$, can be set externally to allow the fastest charging, and to keep the input current below a predetermined limit. Alternatively, this charging current limit can be controlled by the input current limit loop, as will be discussed in more detail below with reference to FIG. 5C.

When in discharging mode, a feedback signal (FB) is received in EA 534, an output of which enters summation circuit 538. Then, comparator 532 can compare a current sensed version of current $i_2$ through inductor $L_2$ via CSA 536 and current detector 506 against the control voltage which is output from summation circuit 538. If the current information exceeds the control voltage, CMP 532 can reset top switch $M_3$ via AND-gate 520, OR-gate 512, R-S flip-flop 510, and logic/driver circuit 508. In a discharging mode, CLK may be set, setting R-S flip-flop 510 via AND-gate 522 and OR-gate 514. In this fashion, energy stored in energy storage element (e.g., capacitor $C_{BUS}$) can be discharged to the output when the output is more than, e.g., about 2% below a nominal level. Any suitable threshold percentages (e.g., 1%, 2%, 3%, 4%, 5%, etc.) can be utilized in particular embodiments.

Then, the charging mode can be initiated when the output recovers to a suitable level. Here, a charge control signal (CHG), which is an inversion via inverter 524 of the discharge control signal (DISCH), can be used via AND-gate 516 with one-shot timer 518 output ($T_{ON}$) generating a reset signal via OR-gate 512 to R-S flip-flop 510. This action may turn off high side switch $M_3$, and turn on low side switch $M_4$. Further, a negative gain may be used at CSA 542, which can set the R-S latch 508 via comparator 540, AND-gate 526, OR-gate 514, and R-S flip-flop 510, to turn off low side switch $M_4$, and also turn on high side switch $M_3$, thus charging the bus capacitor $C_{BUS}$ in the charging mode.

Figure 5C:
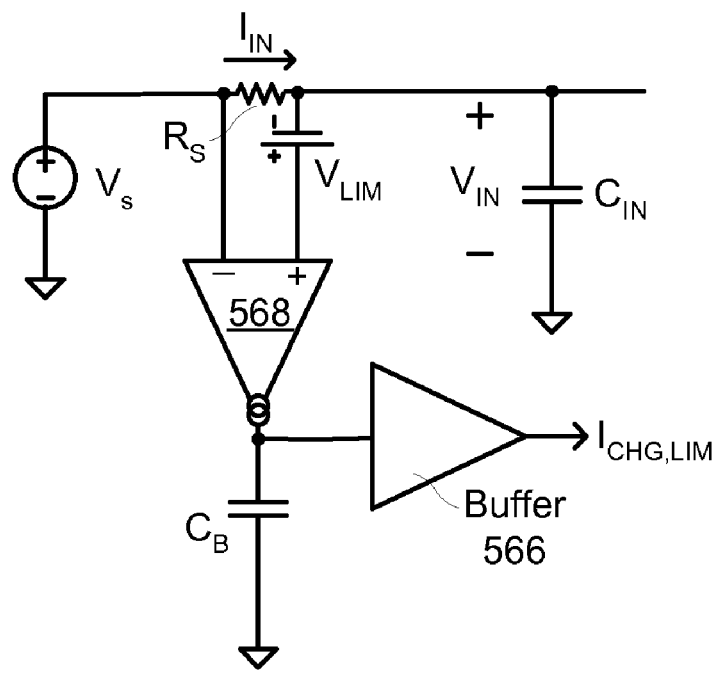
FIG. 5C is a schematic diagram of an example charging limit circuit in accordance with embodiments of the present invention.

Referring now to FIG. 5C, shown is a schematic diagram 500C of an example charging current limit circuit in accordance with embodiments of the present invention. In this example, input current $I_{IN}$ can be sensed with $R_S$ and compared with a predetermined limit at transconductance sense amplifier 568. If $I_{IN}$ is below the predetermined limit $V_{LIM}$, the output of transconductance sense amplifier 568 can saturate at a maximum value, thus allowing a maximum possible charging current via buffer 566. Under heavy load conditions, when input current $I_{IN}$ exceeds the predetermined limit, the output of transconductance sense amplifier 568 can decrease, thus resulting in a lower $I_{CHG,LIM}$ (via buffer 566), which regulates the input current to the predetermined limit. Further, the bandwidth of this input current limit loop may be lower than the regulator circuits (e.g., regulators 302 and 304). Thus in particular embodiments, a charging current can be set to a fixed level, or the charging current can be adaptively determined.

Figure 6A:
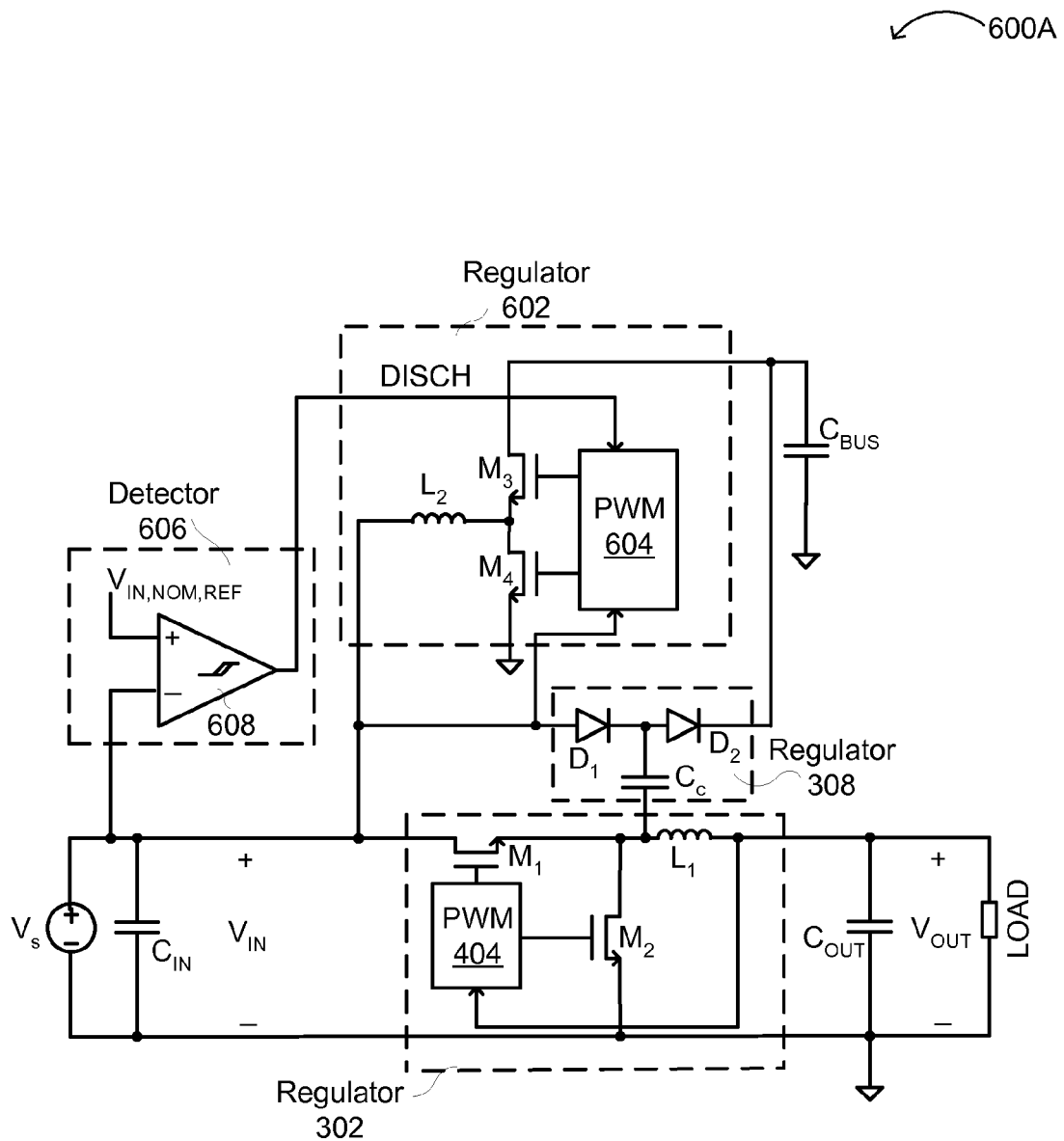
FIG. 6A is a schematic diagram of an example power regulator circuit with an input voltage detector in accordance with embodiments of the present invention.

Referring now to FIG. 6A, shown is a schematic diagram 600A of an example power regulator circuit in accordance with embodiments of the present invention. Regulator 302 can regulate the output voltage $V_{OUT}$ from the input voltage $V_{IN}$. When the load current steps up to a high level, the input voltage $V_{IN}$ can decrease as a result of regulator 302 responding to the load step change. When the input voltage decreases by, e.g., about 5% from its nominal voltage (e.g., as determined by detector 606 using comparator 608 to compare $V_{IN}$ versus $V_{IN,NOM,REF}$), regulator 602 can be allowed to discharge energy stored in $C_{BUS}$ to the input directly.

Regulator 308 can include a charge pump circuit with diodes $D_1$ and $D_2$, and capacitor $C_C$ for use to charge up $C_{BUS}$ from a common node between switches $M_1$, $M_2$, and inductor $L_1$, within regulator 302. The particular example of FIG. 6A differs from that shown above in FIG. 4A in that regulator 602 can discharge energy to $V_{IN}$ instead of $V_{OUT}$, resulting in increased regulation accuracy for some applications. Also, the discharging control circuitry may have a relatively simple implementation, with less stringent response speed control.

Figure 6B:
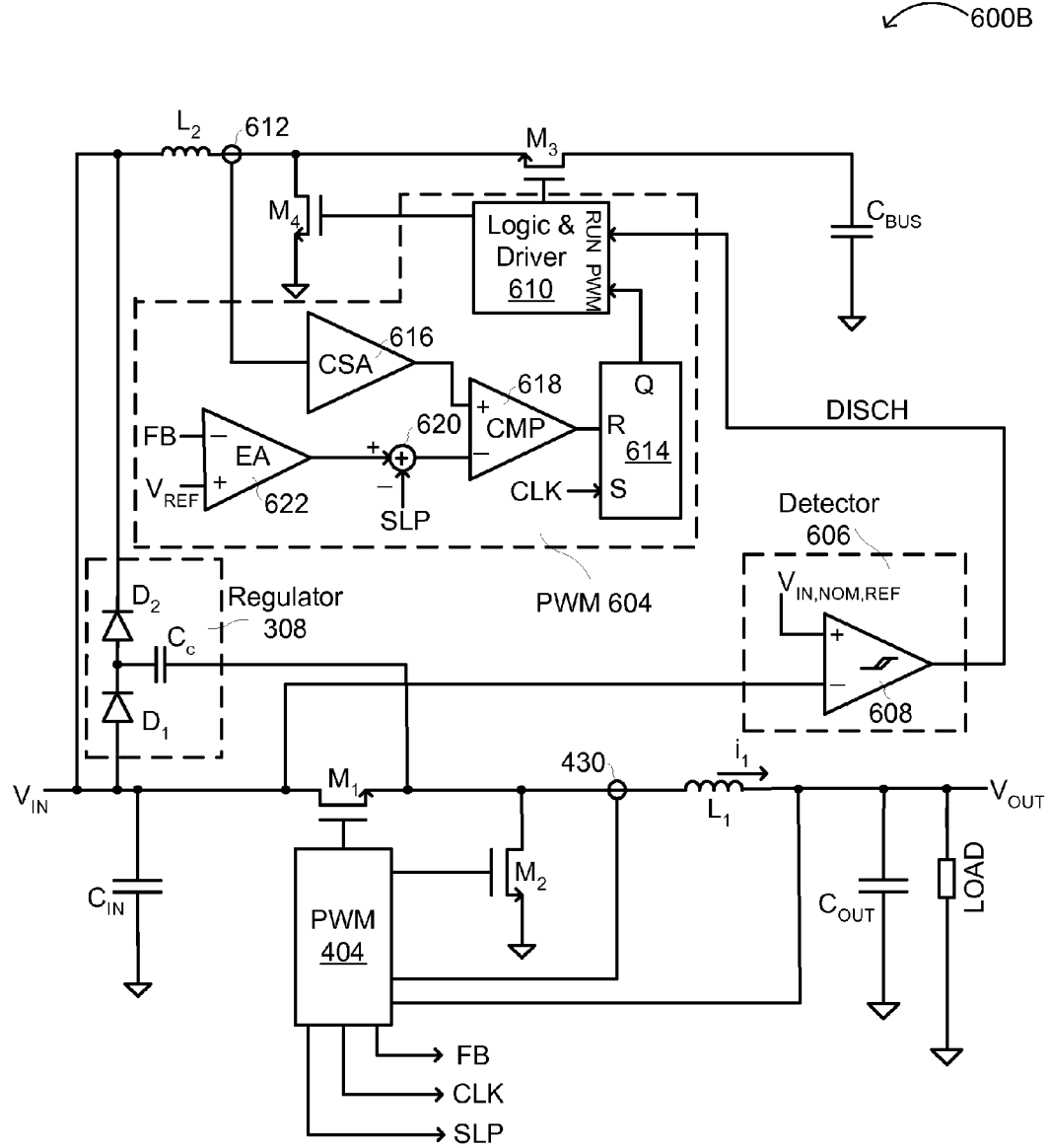
FIG. 6B is a schematic diagram of an example power regulator circuit with PWM control and an input voltage detector in accordance with embodiments of the present invention.

Referring now to FIG. 6B, shown is a schematic diagram 600B of an example power regulator circuit in accordance with embodiments of the present invention. Operation of PWM 604 and PWM 404 may be the same or similar to that shown above in FIG. 4B. However, in the example of FIG. 6B, the regulator with PWM 604 control aims to regulate the input voltage instead of the output voltage. If detector 606 determines that $V_{IN}$ drops below, e.g., about 95% of its nominal point, energy stored in $C_{BUS}$ may be discharge directly onto $C_{IN}$.

Charging and discharging control of switches $M_3$ and $M_4$ may be similar to that discussed above, where EA 622 receives a feedback signal for comparison against a reference, the output of which is subtracted by the slope compensation signal SLP, for comparison (618) against a current sensed version of the inductor current (via current detector 612 and CSA 616), and for control of R-S flip-flop 614 and logic/driver circuit 610. Discharging may stop when $V_{IN}$ recovers to a suitable level, e.g., about 99% of its nominal point. In this example, the nominal voltage of $V_{IN}$ may be any suitable value, such as about 3.3V and about 5V.

Figure 7A:
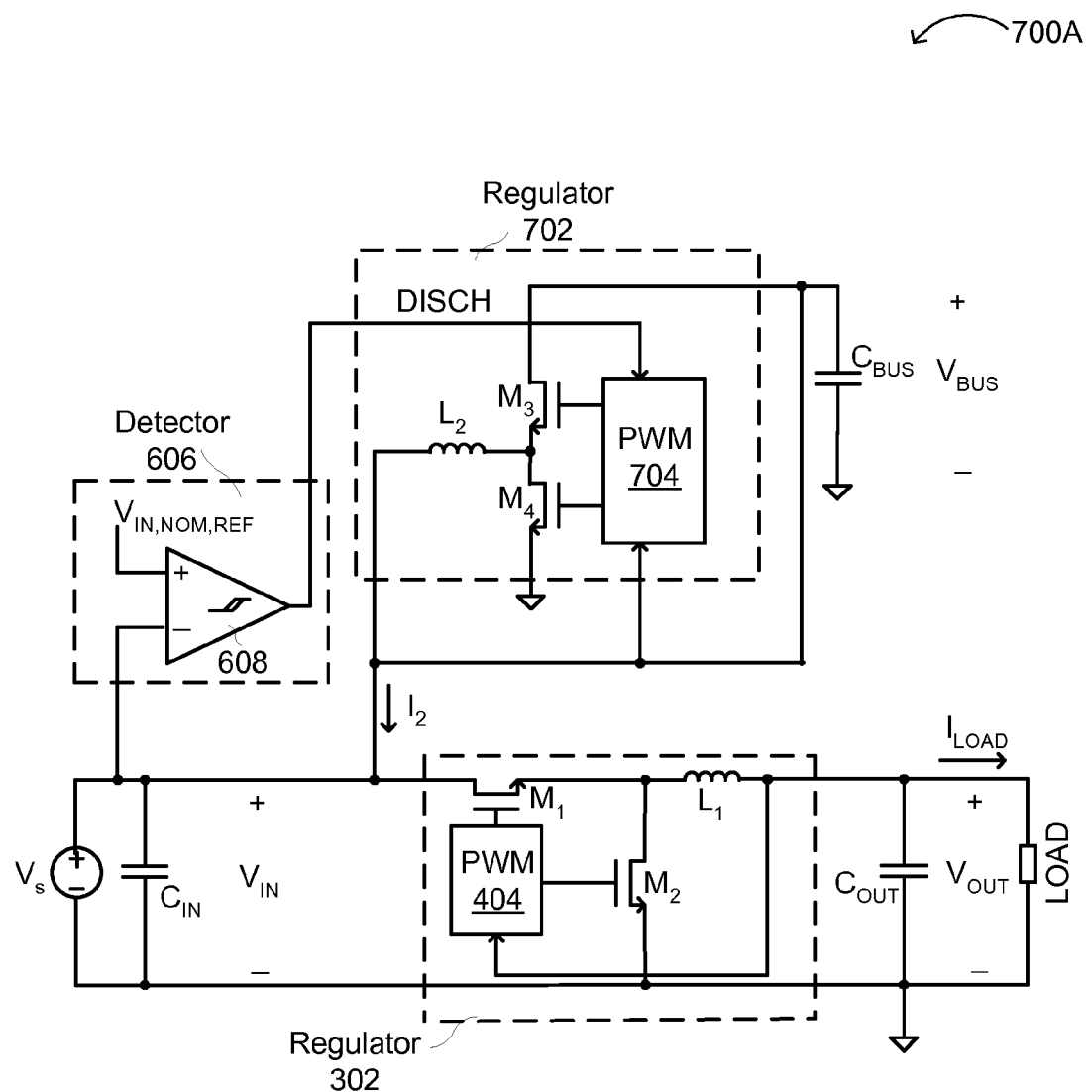
FIG. 7A is a schematic diagram of an example power regulator circuit with two regulators and an input voltage detector in accordance with embodiments of the present invention.

Referring now to FIG. 7A, shown is a schematic diagram 700A of an example power regulator circuit in accordance with embodiments of the present invention. As compared to the example shown above in FIG. 6A, the particular example of FIG. 7A may not use a charge pump circuit to charge up energy at $C_{BUS}$. Instead, the logic within PWM 704 loop can be used for charging of $C_{BUS}$ when the load current is light and the bus voltage is below a preset threshold or maximum limit, $V_{BUS,MAX}$, and also to discharge $C_{BUS}$ to the output when regulator 302 may not be able to supply a heavy load demand from the available power at the input source. The approach of FIG. 7A can also provide flexibility in regulating the $C_{BUS}$ voltage to achieve a minimum capacitor size for $C_{BUS}$ and thus an overall capacitor size in the system.

As compared to the example shown in FIG. 5A, regulator 702 can draw the charging current from $V_{IN}$ instead of $V_{OUT}$, and also reduce power loss in regulator 302, as well as reduce potential output ripple when in the charging mode. Regulator 702, using PWM control 704, can discharge stored energy from $C_{BUS}$ to $V_{IN}$ (as opposed to $V_{OUT}$). In addition, regulation accuracy and response speed of the discharging control can be somewhat relaxed in a relatively simple implementation.

Figure 7B:
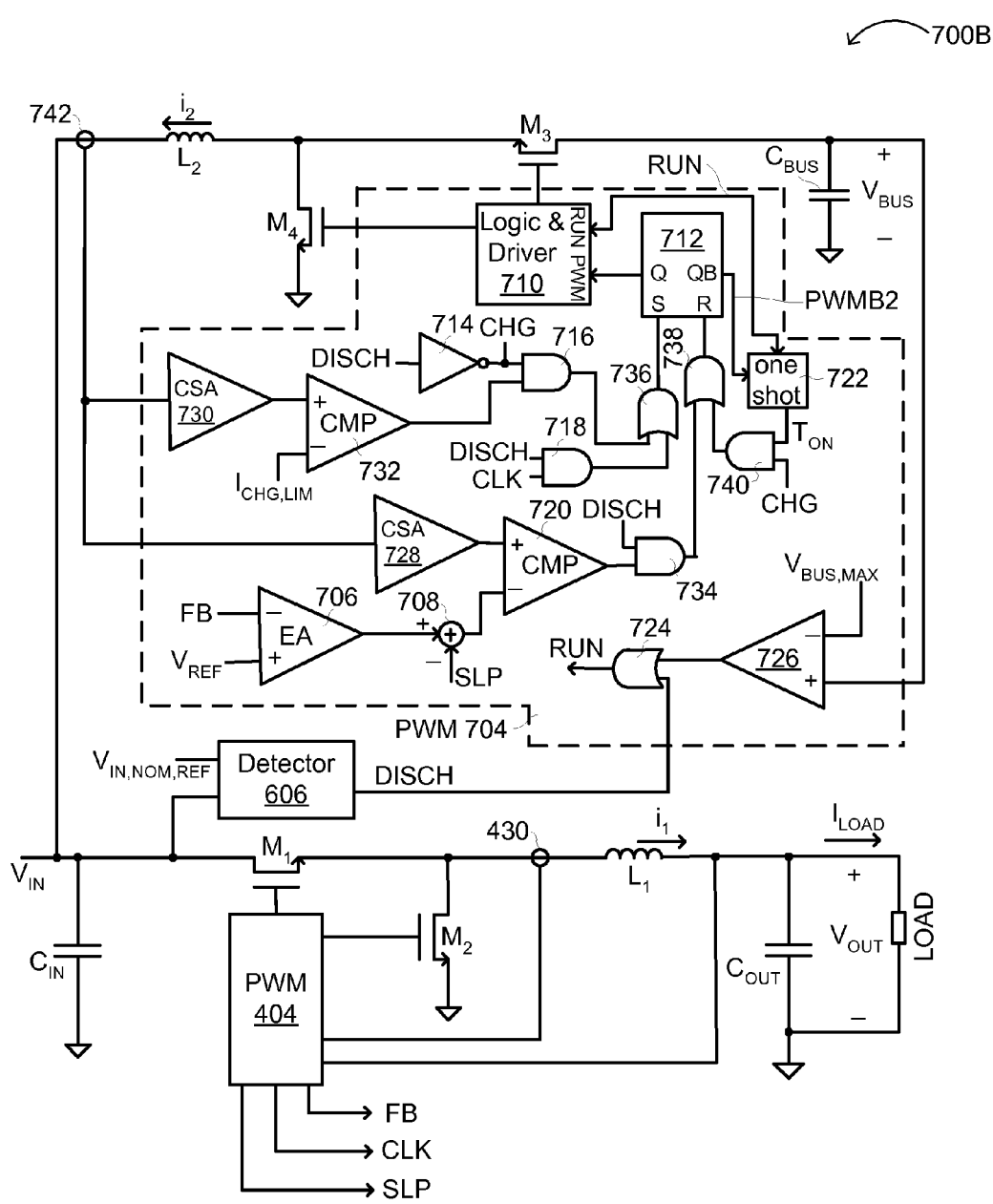
FIG. 7B is a schematic diagram of an example power regulator circuit with two regulators and PWM control in accordance with embodiments of the present invention.

Referring now to FIG. 7B, shown is a schematic diagram 700B of an example power regulator circuit in accordance with embodiments of the present invention. The input voltage can be sensed directly to detect heavy load conditions, and when $V_{IN}$ is, e.g., about 5% below its nominal point, the regulator using control PWM 704 and including switching devices $M_3$ and $M_4$, operates under discharging mode. The discharging can stop when $V_{IN}$ recovers to, e.g., about 99% of its nominal point. The charging follows when the input current is below a predetermined limit, $I_{IN,MAX}$ and the $C_{BUS}$ voltage ($V_{BUS}$) is below a preset threshold, $V_{BUS,MAX}$. The discharging operation can be the same or similar to as that shown in FIG. 6B, and the charging operation may be the same or similar to the charging operation in the circuit shown in FIG. 5B.

In this example, PWM 704 is used in a bi-directional regulator that can discharge energy stored in $C_{BUS}$ under heavy load conditions, and charge $C_{BUS}$ when there is spare input power from the source $V_{IN}$. The input voltage $V_{IN}$ can be sensed directly via detector 606 to detect such heavy load conditions. When $V_{IN}$ is about 5% below its nominal value, the DISCH control signal can go high, indicating discharging mode for the regulator controlled by PWM 704. The discharging can stop when $V_{IN}$ returns to a suitable regulation point. The charging can follow via control signal RUN when the input current is below a predetermined limit ($I_{IN,MAX}$), and the $C_{BUS}$ voltage ($V_{BUS}$) is below threshold $V_{BUS,MAX}$, via comparator 726 and OR-gate 724. In charging mode, $M_4$ may be turned on until the charging current reaches the current limit, $I_{CHG,LIM}$. $M_3$ may then be turned on for a predetermined time, $T_{ON}$, which is generated via one-shot circuit 722. $T_{ON}$ can be designed to be proportional to $V_{BUS}$ for maintenance of a roughly constant frequency operation. A next charging cycle can repeat when the $T_{ON}$ timer expires. The charging operation can stop when $V_{OUT}$ reaches a preset maximum level.

When in discharging mode, FB may be received in EA 706, an output of which enters summation circuit 708. Then, comparator 720 can compare a current sensed version of current $i_2$ through inductor $L_2$ via CSA 728 and current detector 742. If the current information exceeds the control voltage, which is the output of EA 706 subtracted by the slope compensation signal SLP, CMP 720 can reset top switch $M_3$ via AND-gate 734, OR-gate 738, R-S flip-flop 712, and logic/driver circuit 710. In a discharging mode, CLK may be set, setting R-S flip-flop 712 via AND-gate 718 and OR-gate 736. In this fashion, energy stored in energy storage element (e.g., capacitor $C_{BUS}$) can be discharged to the input when the input is more than, e.g., about 5% below a nominal level.

Then, the charging mode can be initiated when the input sufficiently recovers. Here, CHG (via inverter 714), can be used via AND-gate 740 with one-shot timer 722 output ($T_{ON}$) generating a reset signal via OR-gate 738 to R-S flip-flop 712. This action may turn off high side switch $M_3$ and turn on low side switch $M_4$. Further, a negative gain may be used at CSA 730, which can set the PWM control signal via comparator 732, AND-gate 716, OR-gate 736, and R-S flip-flop 712, to turn off low side switch $M_4$, and also turn on high side switch $M_3$, thus charging the inductor L2 in the charging mode.

Figure 7C:
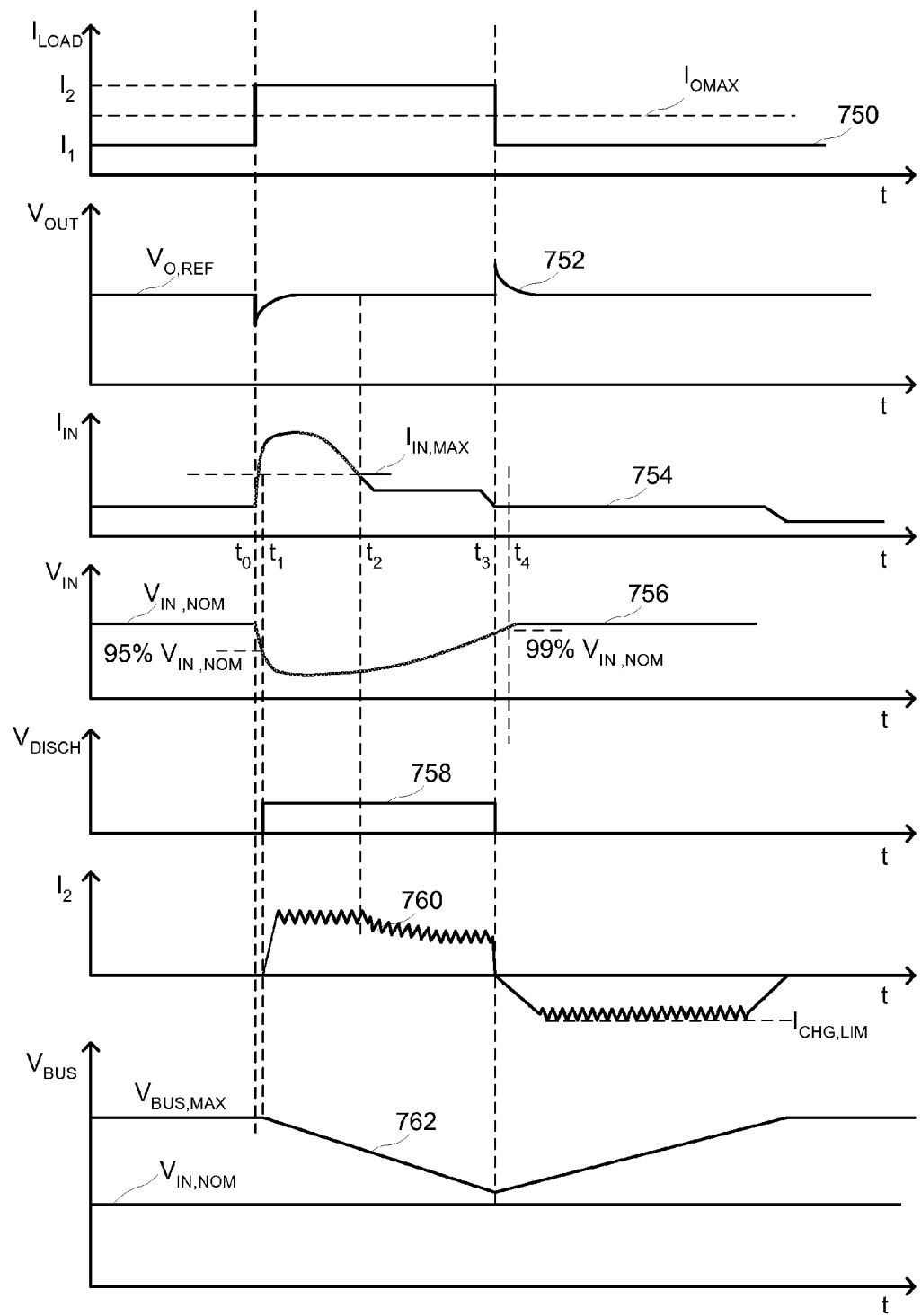
FIG. 7C is a waveform diagram showing example operation of the circuit shown in FIG. 7A, in accordance with embodiments of the present invention.

Referring now to FIG. 7C, shown is a waveform diagram of example operation of the circuit shown in FIG. 7A, in accordance with embodiments of the present invention. For example, $I_{LOAD}$ is shown as waveform 750, $V_{OUT}$ is shown as waveform 752, $I_{IN}$ is shown as waveform 754, $V_{IN}$ is shown as waveform 756, $V_{DISCH}$ is shown as waveform 758, $I_2$ is shown as waveform 760, and $V_{BUS}$ is shown as waveform 762.

In this example, initially the load is light and only regulator 302 (as shown in FIG. 7A) operates to support a low output load current at $I_1$. At time instant $t_o$, the load increases instantly to a high level $I_2$. The output voltage instantly dips and causes regulator 302 to draw more input current in an attempt to support higher output current. The input current can exceed its maximum limit $I_{IN,MAX}$, resulting in a falling input voltage. At time instant $t_1$, the input voltage falls below 95% of its nominal value, and detector 606 produces the discharging command (DISCH) to regulator 702, which in turns start discharging energy stored in $C_{BUS}$ into the input voltage rail. When the discharging current exceeds the input current drawn by regulator 302, the input voltage may recover slightly. During this stage, the bus voltage continues decreasing. At time instant $t_3$, the output load current returns to low level $I_1$. The output voltage overshoots slightly, forcing regulator 302 to stop drawing current from the input, and the input voltage recovers quickly. At time instant $t_4$, the input voltage exceeds, e.g., 99% of the nominal value. Then, the discharge operation stops. If the bus cap voltage is below its maximum value, regulator 702 starts recharging the bus capacitor. As discussed above, a maximum charging current may be programmed externally or internally by a maximum input current limit or load condition.

Exemplary Method of Controlling Power Regulation

In one example, a method of converting a power source at an input terminal into a regulated output level at a load coupled to an output terminal, includes: (i) regulating a voltage of the load directly from the power source using a first regulator; (ii) determining whether the load is in a first load condition or a second load condition; (iii) charging energy to an energy storage element during the first load condition; and (iv) discharging energy from the energy storage element when in the second load condition for maintaining the regulated output level at the load, and for maintaining input current or power below a predetermined limit, where the predetermined limit constrains power provided by the power source.

Figure 8:
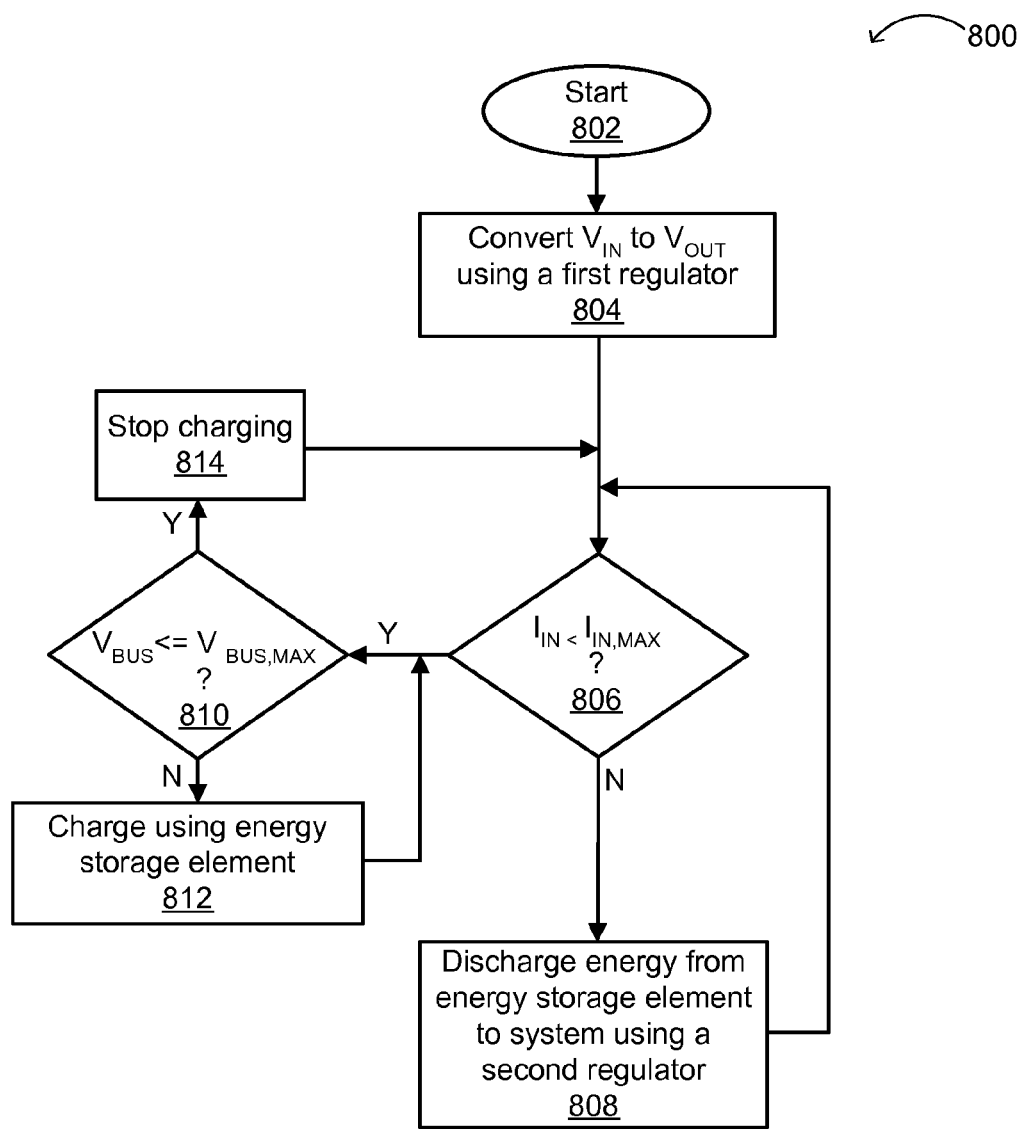
FIG. 8 is a flow diagram showing an example method of minimizing capacitor sizes for a high density regulator powering loads with large transient steps and limited input power, in accordance with embodiments of the present invention.

Referring now to FIG. 8, shown is a flow diagram 800 of an example method of minimizing capacitor sizes for a high density regulator powering loads with large transient steps and limited input power, in accordance with embodiments of the present invention. The flow begins (802), and a first regulator (e.g., regulator 302) can be used to convert an input voltage $V_{IN}$ to an output voltage $V_{OUT}$ directly to achieve high efficiency operation (804). In 806, the input current ($I_{IN}$) can be compared against a predetermined limit ($I_{IN,MAX}$). If the input current is over this predetermined limit, a second regulator (e.g., regulator 304) can discharge energy stored in an energy storage element (e.g., $C_{BUS}$), where the second regulator is outside of a main power path of the first regulator (808). However, if the input current is within the predetermined limit, then the voltage on the energy storage element ($V_{BUS}$) may be compared against a preset maximum voltage ($V_{BUS,MAX}$) in 810. If $V_{BUS}$ is lower than or equal to $V_{BUS,MAX}$, the energy storage element is charged (812). However, if $V_{BUS}$ is higher than $V_{BUS,MAX}$, charging of $C_{BUS}$ may be stopped (814).

Any suitable input and regulated output voltages can be accommodated in particular embodiments. For example, in a buck step down type of regulator, an input voltage can range from about 2.5 V to about 5.5 V, such as from about 2.7 to about 4.2 V, and including about 4.2 V. Regulated output voltages in such a step down regulator example can range from about 0.8 V to abut 2.2 V, and including from about 1 V to about 1.8 V, and more specifically about 1.5 V. For example, some such voltages can apply in a cell phone application, and can be utilized for main chip power, random-access memory (RAM) power, or the like.

While the above examples include circuit and structural implementations of certain regulators, one skilled in the art will recognize that other technologies and/or regulator structures can be used in accordance with embodiments. Further, one skilled in the art will recognize that other device circuit arrangements, elements, and the like, may also be used in accordance with embodiments. For example, although charge pump voltage doubler circuits have been shown herein, please circuits can be replaced by multi-stage charge pump circuitry, such as voltage tripler, voltage quadrupler, and so on. In addition, such circuitry may also adopt an inductor based switching regulator (e.g., boost regulator, buck-boost, flyback, etc.). Also, while control circuitry described above can be implemented using AND-gates, OR-gates, S-R flip-flops, detectors, comparators, and/or amplifiers, particular embodiments are also applicable to other circuit components. Also, methods and circuits discussed herein can also be applied to different power devices (e.g., a p-type MOS transistor, BJT devices, etc.), and to different topologies (e.g., forward, half bridge, full bridge, etc.) converters. In addition, while particular embodiments may apply to an input source with a preset limit in current or power, this limit, instead of being fixed, may vary with operating conditions and/or on a type of voltage source. For example, in a battery source application, the maximum current available from the battery cell may be limited by its internal impedance and state of charge. Also, in some AC input application examples, the input current may be actively limited to be proportional to the input voltage.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A power supply, comprising:
a) an input capacitor coupled to an input terminal, said input terminal being coupled to a power source, said power source providing energy that is constrained by a predetermined limit of said power source;
b) an output capacitor coupled to an output terminal, said output terminal being coupled to a load, wherein said load is detected as being in a first load condition or a second load condition;
c) a first regulator configured to convert an input voltage at said input terminal to directly regulate an output voltage at said output terminal to power said load;
d) a second regulator coupled between said first regulator and an energy storage element, wherein said second regulator is configured to deliver energy from said energy storage element to said first regulator to maintain regulation of said output voltage at said output terminal when said second load condition is detected; and
e) a third regulator coupled between said first regulator and said energy storage element, wherein said third regulator is configured to deliver energy from said first regulator to said energy storage element when said first load condition is detected.

2. The power supply of claim 1, wherein said predetermined limit of said power source is variable based on an operating condition of said power source.

3. The power supply of claim 1, wherein said predetermined limit of said power source limits a current or a power provided from said power source.

4. The power supply of claim 3, wherein said third regulator is configured to charge said energy storage element when current or power drawn from said input terminal is below said predetermined limit of said power source.

5. The power supply of claim 1, wherein said second regulator is configured to deliver energy directly to said output terminal for regulating said output voltage together with said first regulator under said second load condition.

6. The power supply of claim 5, wherein said second regulator is configured to:
   a) sense said output voltage at said output terminal; and
   b) deliver energy from said energy storage element to said output terminal when said sensed output voltage is below a target regulation level.

7. The power supply of claim 1, wherein said second regulator is configured to deliver energy to said input terminal during said second load condition to prevent current or power at said input terminal from exceeding said predetermined limit of said power source.

8. The power supply of claim 7, wherein said second regulator is configured to:
   a) sense voltage conditions at said input terminal; and
   b) deliver energy from said energy storage element to said input terminal when said sensed voltage indicates said second load condition.

9. The power supply of claim 7, wherein said second regulator is configured to:
   a) sense voltage conditions at said output terminal; and
   b) deliver energy from said energy storage element to said input terminal when said sensed voltage indicates said second load condition.

10. The power supply of claim 5, wherein said third regulator comprises a charging current limit circuit, said charging current limit circuit being configured to limit a maximum charging current into said energy storage element.

11. The power supply of claim 10, wherein said charging current limit circuit further limits said maximum charging current drawn from said input terminal when said power source at said input terminal is below said predetermined limit of said power source.

12. The power supply of claim 1, wherein said energy storage element is charged when current or power drawn from said power source at said input terminal is lower than said predetermined limit of said power source.

13. The power supply of claim 12, wherein said energy storage element is charged when energy stored in said energy storage element is below a preset threshold.

14. The power supply of claim 1, wherein said second load condition occurs when power drawn by said load at said output terminal exceeds said predetermined limit of said power source.

15. A method of converting a power source at an input terminal into a regulated output level at a load coupled to an output terminal, the method comprising:
   a) regulating a voltage of said load directly from said power source using a first regulator;
   b) detecting whether said load is in a first load condition or a second load condition;
   c) delivering, by regulator, energy from said first regulator to an energy storage element during said first load condition; and
   d) delivering, by a second regulator, energy from said energy storage element when in said second load condition for maintaining said regulated output level at said load, and for maintaining operation of said power source within a predetermined limit that constrains energy provided by said power source.

16. The power supply of claim 1, wherein said third regulator comprises a charge pumping circuit.

17. The method of claim 15, wherein said first load condition comprises energy drawn by said load being within said predetermined limit supportable by said power source.

18. The method of claim 15, wherein said second load condition comprises energy drawn by said load exceeding said predetermined limit supportable by said power source.

19. The method of claim 15, wherein each of said second and third regulators are coupled between said first regulator and said energy storage element.

20. The method of claim 15, wherein said delivering energy from said energy storage element when in said second load condition comprises discharging said energy to said output terminal.

21. The method of claim 15, wherein said delivering energy from said energy storage element when in said second load condition comprises discharging said energy to said input terminal.

* * * * *